United States Patent
Takata et al.

(10) Patent No.: US 9,610,826 B2
(45) Date of Patent: Apr. 4, 2017

(54) AIR-CONDITIONING CONTROL DEVICE FOR VEHICLE

(71) Applicant: MAZDA MOTOR CORPORATION, Hiroshima (JP)

(72) Inventors: Naoki Takata, Higashihiroshima (JP); Kazuhiro Miyagawa, Hiroshima (JP); Shinobu Kato, Hiroshima (JP); Shinshi Kajimoto, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 17 days.

(21) Appl. No.: 14/628,660

(22) Filed: Feb. 23, 2015

(65) Prior Publication Data
US 2015/0273982 A1    Oct. 1, 2015

(30) Foreign Application Priority Data

Mar. 27, 2014    (JP) .................................. 2014-065074

(51) Int. Cl.
*G05D 1/00*    (2006.01)
*B60H 1/32*    (2006.01)
(Continued)

(52) U.S. Cl.
CPC ....... *B60H 1/3208* (2013.01); *B60H 1/00407* (2013.01); *B60H 1/00421* (2013.01); *B60H 1/00735* (2013.01); *B60H 1/00778* (2013.01); *B60H 1/00828* (2013.01); *B60H 1/00892* (2013.01); *B60H 1/322* (2013.01); *B60W 10/06* (2013.01); *B60W 10/30* (2013.01); *B60W 2510/0642* (2013.01); *B60W 2510/30* (2013.01);
(Continued)

(58) Field of Classification Search
USPC .... 701/36; 62/3.61, 498, 53.2, 61, 133, 239, 62/241, 243, 244; 165/202, 204, 271, 43, 165/44, FOR. 114
See application file for complete search history.

(56) References Cited

U.S. PATENT DOCUMENTS

2005/0193747 A1*  9/2005  Kajimoto ........... B60H 1/00778
                                              62/133
2008/0020697 A1*  1/2008  Heil ................... B60H 1/00407
                                              454/136

(Continued)

FOREIGN PATENT DOCUMENTS

JP    2001-088537 A    4/2001

*Primary Examiner* — Muhammad Shafi
(74) *Attorney, Agent, or Firm* — Studebaker & Brackett PC

(57) ABSTRACT

A blower fan is driven, and conditioning air flows down through an evaporator and then is supplied into a vehicle compartment. An idling-stop condition in a roof-open state is set to make an idling stop to be relatively easily attained, compared to a roof-closed state, so that a fuel economy can be improved. When an outside-air temperature is a specified temperature or higher or a solar-radiation intensity is a specified degree or greater at an engine's automatic stop, the blower fan is driven, so that the conditioning air is supplied toward a passenger in a manner of an electric fan. The evaporator through which the conditioning air flows down is sufficiently cool at the timing right after the automatic stop of the engine. Accordingly, it is preferable to configure such that the sufficiently-cooled conditioning air is supplied for a properly-long period of time.

11 Claims, 8 Drawing Sheets

(51) Int. Cl.
  B60H 1/00 (2006.01)
  B60W 10/06 (2006.01)
  B60W 10/30 (2006.01)
(52) U.S. Cl.
  CPC ..... *B60W 2550/12* (2013.01); *B60W 2710/30* (2013.01)

(56) References Cited

U.S. PATENT DOCUMENTS

2008/0302878 A1\* 12/2008 Helms ................ B60H 1/00407
  236/49.3
2014/0060796 A1\* 3/2014 Ichishi ............... B60H 1/00864
  165/204

\* cited by examiner

Air Supply Mode Target Air-Flow Amount

Outside-Air Tempt.

Air Supply Mode Target Air-Flow Amount

Solar-Radiation Amount

AIR-CONDITIONING CONTROL DEVICE FOR VEHICLE

BACKGROUND OF THE INVENTION

The present invention relates to an air-conditioning control device for a vehicle.

In the air-conditioning control device for the vehicle, a cool-air generator including a compressor, a condenser and an evaporator and a hot-air generator with a heat source of engine cooling water are provided, and conditioning air having a specified temperature is obtained by changing the mixture ratio of the cool air and the hot air. This conditioning air is supplied into a vehicle compartment by a blower fan, in which the amount of the supplied conditioning air is adjusted by changing a rotational speed of the blower fan. Generally, the above-described compressor is driven by an engine and a water pump to circulate the cooling water is driven by the engine as well. Accordingly, when the engine stops, the compressor and the water pump are stopped, so that the cool-air generation function and the hot-air generation function stop.

Further, in the air-conditioning control device for the vehicle, an automatic air conditioning, in which an actual temperature inside the vehicle compartment is automatically controlled at a target temperature, becomes the mainstream. The automatic control of air conditioning is conducted based on parameters representing a vehicle-compartment inside environmental condition, a vehicle-compartment outside environmental condition, and an air-conditioning operational state by a driver (especially, setting of the above-described target inside temperature), so that the conditioning-air supply temperature, a conditioning-air outlet, the conditioning-air supply amount and others are adjusted automatically.

Meanwhile, some vehicles have recently adopted a so-called idling stop (start stop) which automatically stops the engine in order to improve the fuel economy (gas millage) when the vehicle travels at a considerably-low speed or during a vehicle stop. The idling stop is executed when a predetermined start condition is met (satisfied). Herein, this start condition is generally configured such that some conditions including zero vehicle speed (vehicle stopping), brake operating, no accelerator operating, a shift range of D-position, and others are all met, for example.

In a vehicle provided with a roof which is configured to be open and closed, such as an open car, an air conditioning mode is changeable in vehicle states: between a roof-open state and a roof-closed state, as described in Japanese Patent Laid-Open Publication No. 2001-88537. Herein, an inside/outside air mode, in which the control is conducted based on a target supply temperature, is selected in the roof-closed state, but an inside air mode is forcibly selected regardless of the target supply temperature in the roof-open state. The mode control described in the above-described patent document aims to maintain the air-flow amount supplied from an outlet of an air-conditioning unit at a constant value regardless of the vehicle speed by selecting the intake air mode in the roof-open state.

Herein, demand for the air conditioning in the roof-open state where the driver tends to enjoy traveling, feeling the outside air, may be relatively low, compared to a case of traveling in the roof-closed state. Meanwhile, if an idling-stop condition for stopping the engine automatically by the idling stop is configured to be the same between the roof-open state and the roof-closed state, the roof-open state with the lower air-conditioning demand may have less opportunity of automatically stopping the engine by the idling stop. Therefore, it may be considered that the idling-stop condition for the roof-open state is relaxed so as to make the idling stop to be relatively easily attained, compared to the roof-closed state, thereby increasing the opportunity of automatically stopping the engine.

Relaxing the idling-stop condition so as to make the idling stop to be relatively easily attained as described above is preferable in improving the fuel economy. By contrast, if the operation of the air-conditioning device stops, which is caused by the automatic stop of the engine by the idling stop, the passenger may be easily influenced by the outside-air temperature or the solar radiation because the roof is open, so that the passenger may have uncomfortable feelings improperly (the passenger's demand for the air conditioning may not be met).

SUMMARY OF THE INVENTION

The present invention has been devised in view of the above-described matters, and an object of the present invention is to provide an air-conditioning control device for a vehicle which can increase the opportunity of automatically stopping the engine by the idling stop and also meet the passenger's demand for the air conditioning properly.

According to the present invention, there is provided an air-conditioning control device for a vehicle provided with a roof which is configured to be open and closed, comprising a controller of an idling stop in which an engine is automatically stopped when a specified idling-stop condition including a vehicle stop is met, and a controller of an air-conditioning system which includes a blower fan for adjusting an air-flow amount and an evaporator for air conditioning which is cooled by a drive source of the engine, wherein the controller of the idling stop is configured to control the idling stop such that an idling-stop condition for stopping the engine automatically in a case in which the roof is open is relaxed so as to make the idling stop to be relatively easily attained, compared to a case in which the roof is closed, and the controller of the air-conditioning system is configured to drive the blower fan so as to make conditioning air blow toward a passenger when an outside-air temperature is a specified temperature or higher or a solar-radiation intensity is a specified degree or greater in a case in which the roof is open and the engine is automatically stopped by the idling stop.

In the present invention, since the idling-stop condition for the roof-open state in which the driver's demand for the air conditioning is relatively low is relaxed so as to make the idling stop to be relatively easily attained, compared to the roof-closed state, the opportunity of automatically stopping the engine by the idling stop is increased, so that the fuel economy can be improved. Further, since the blower fan is driven and thereby the conditioning air is made to blow toward the passenger when the outside-air temperature is the specified temperature or higher or the solar-radiation intensity is the specified degree or greater in the roof-open state in which the driver may be easily influenced by the outside-air temperature or the solar radiation, the air-conditioning system functions as a kind of electric fan, so that the passenger can be prevented from having uncomfortable feelings.

According to an embodiment of the present invention, the controller of the air-conditioning system is configured to control the air-conditioning system such that at least for a specified period of time after the engine is automatically stopped by the idling stop, the conditioning air from the blower fan flows down through the evaporator and the air-flow amount is adjusted at a first air-flow amount which is smaller than an air-flow amount at the timing right before the engine is automatically stopped by the idling stop. In this embodiment, since the evaporator is sufficiently cooled for a while at the timing right after the engine stop, the conditioning air flowing through the properly-cooled evaporator is made to blow down, so that the passenger can be prevented from having uncomfortable feelings more properly. Further, since the air-flow amount at that time is adjusted so as to be smaller than the air-flow amount at the timing right before the engine is automatically stopped, the cool air can be made to blow down for a properly-long time.

The controller of the air-conditioning system may be configured to control the air-conditioning system such that after the specified period of time has passed, the air-flow amount is adjusted at a second air-flow amount which is larger than the first air-flow amount. In this case, the air-flow amount can be sufficiently large even in a case in which the evaporator is not sufficiently cooled, so that it can be properly prevented that the passenger has uncomfortable feelings.

Herein, the above-described second air-flow amount is configured to be larger than the air-flow amount at the timing right before the engine is automatically stopped by the idling stop. Thereby, the above-described effects can be preferably obtained.

According to another embodiment of the present invention, the controller of the air-conditioning system is configured to control the air-conditioning system such that an air-flow amount of the conditioning air in a case in which the engine is automatically stopped by the idling stop changes according to at least one of the outside-air temperature and the solar-radiation intensity. In this embodiment, the air-flow amount can be preferably set at a large one for properly preventing the driver from having uncomfortable feelings.

Other features, aspects, and advantages of the present invention will become apparent from the following description which refers to the accompanying drawings.

DETAILED DESCRIPTION OF THE INVENTION

Hereinafter, a preferred embodiment of the present invention will be described specifically referring to the accompanying drawings.

Figure 1:
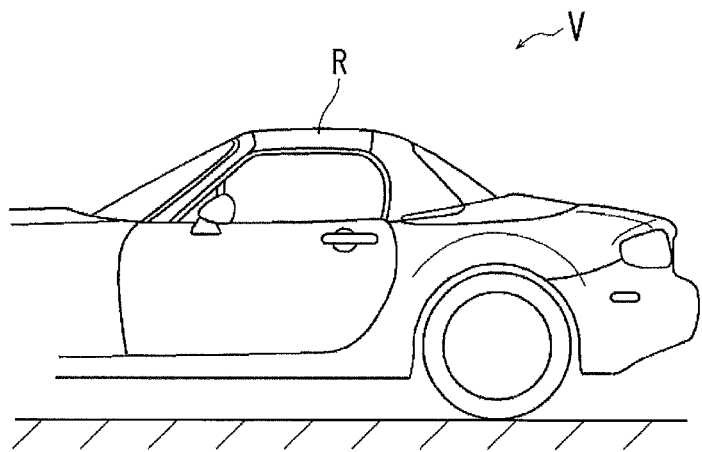
FIG. 1 is a diagram showing a state of a vehicle in which a roof is closed.
Figure 2:
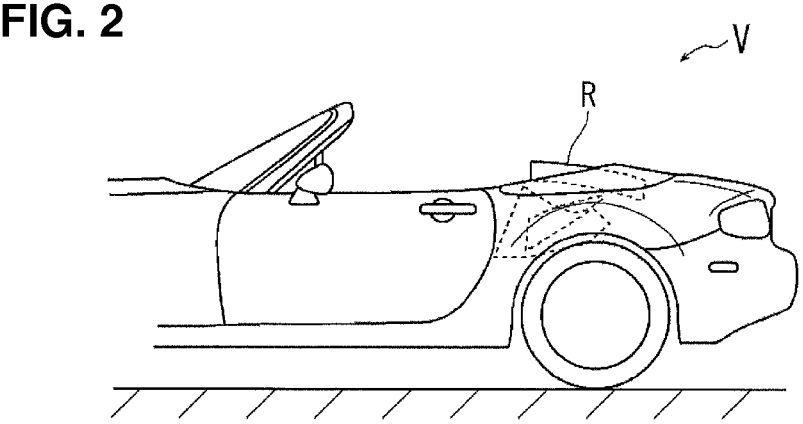
FIG. 2 is a diagram showing a state in which the roof is opened from the state of FIG. 1.

FIG. 1 shows a vehicle V provided with a roof configured to be open and closed, and a roof-closed state in which a roof R is closed is shown in this figure. FIG. 2 shows a roof-open state in which the roof R is opened from the state of FIG. 1.

Figure 3:
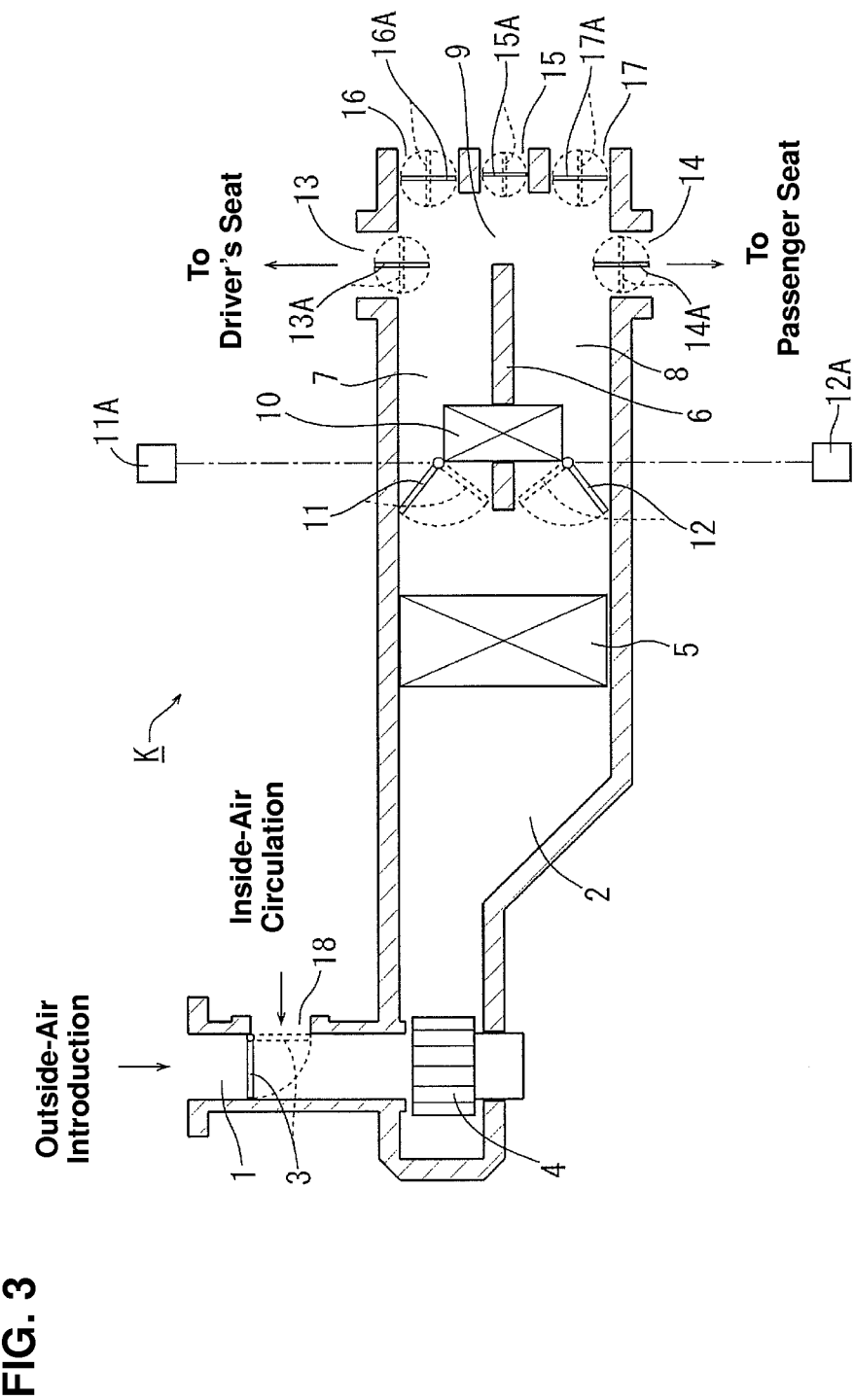
FIG. 3 is a schematic diagram showing an example of an air-conditioning system.

FIG. 3 shows an example of a passage structure of an air-conditioning system K. The air-conditioning system K is configured such that a switching damper 3, a blower fan 4, and an evaporator 5 are arranged in order from an upstream side (an inlet 1) toward a downstream side in a passage portion 2 including the inlet 1. A portion of the passage portion 2 which is located downstream of the evaporator 5 is divided into two independent passages 7, 8, which are arranged in parallel with a partition wall 6. Respective downstream sides of the independent passages 7, 8 are joined together, and a common chamber 9 is formed accordingly.

A heater core 10 which projects into the two independent passages 7, 8 is held at the partition wall 6. An air mixture damper 11 is arranged right upstream of the heater core 10 in the independent passage 7. Likewise, an air mixture damper 12 is arranged right upstream of the heater core 10 in the independent passage 8. An air passage for a driver's seat 13 is formed at the passage portion 2 such that it opens at a portion of the independent passage 7 which is located upstream of the common chamber 9. Further, an air passage for a passenger seat (assistant driver's seat) 14 is formed at the passage portion 2 such that it opens at a portion of the independent passage 8 which is located upstream of the common chamber 9. Moreover, plural air passages 15-17 open at the common chamber 9. The air passage 15 is a passage for a defroster and the air passages 16, 17 are passages for side vents, for example. Dampers for opening adjustment 13A-17A are arranged in the air passages 13-17, respectively.

A part of cool air flowing down through the evaporator 5 flows through the heater core 10. A flow ratio of the above-described part of the cool air relative to the cool air flowing down through the evaporator 5 is changed by adjusting an opening degree (position) of the air mixture damper 11, so that the temperature and the humidity of the air which has just passed in the independent passage 7 is adjusted. This air having just passed in the independent passage 7 is supplied toward a driver's seat. Herein, the air mixture damper 11 is driven by an electric motor (actuator) 11A so that the air mixture damper 11 can take any opening degree within a range of 0-100%.

Likewise, a part of cool air flowing down through the evaporator 5 flows through the heater core 10. A flow ratio of the above-described part of the cool air relative to the cool air flowing down through the evaporator 5 is changed by adjusting an opening degree (position) of the air mixture damper 12, so that the temperature and the humidity of the air which has just passed in the independent passage 8 is adjusted. This air having just passed in the independent passage 8 is supplied toward a passenger seat (assistant driver's seat). Herein, the air mixture damper 12 is driven by an electric motor (actuator) 12A so that the air mixture damper 12 can take any opening degree within a range of 0-100%.

As apparent from the above-described description, the air conditioning for the driver's seat and the air conditioning for the passenger seat are configured to be controlled independently in the present embodiment. When the air mixture dampers 11, 12 take the opening degree of 100%, which is illustrated by solid lines in the figure, the air-conditioning temperature for the driver's seat and the passenger seat becomes the highest. On the contrary, when the air mixture dampers 11, 12 take the opening degree of 0%, which is illustrated by broken lines in the figure, the air-conditioning temperature for the driver's seat and the passenger seat becomes the lowest. Herein, mixture air of the conditioning air flowing in the independent passage 7 and the conditioning air flowing in the independent passage 8 is supplied to the air passages 15-17.

Reference character 18 denotes an inside-air introduction port which is provided near the inlet 1, which is switched (opened or closed) by the above-described switching damper 1 which takes a position for providing an outside-air introduction and another position for providing an inside-air circulation.

Figure 4:
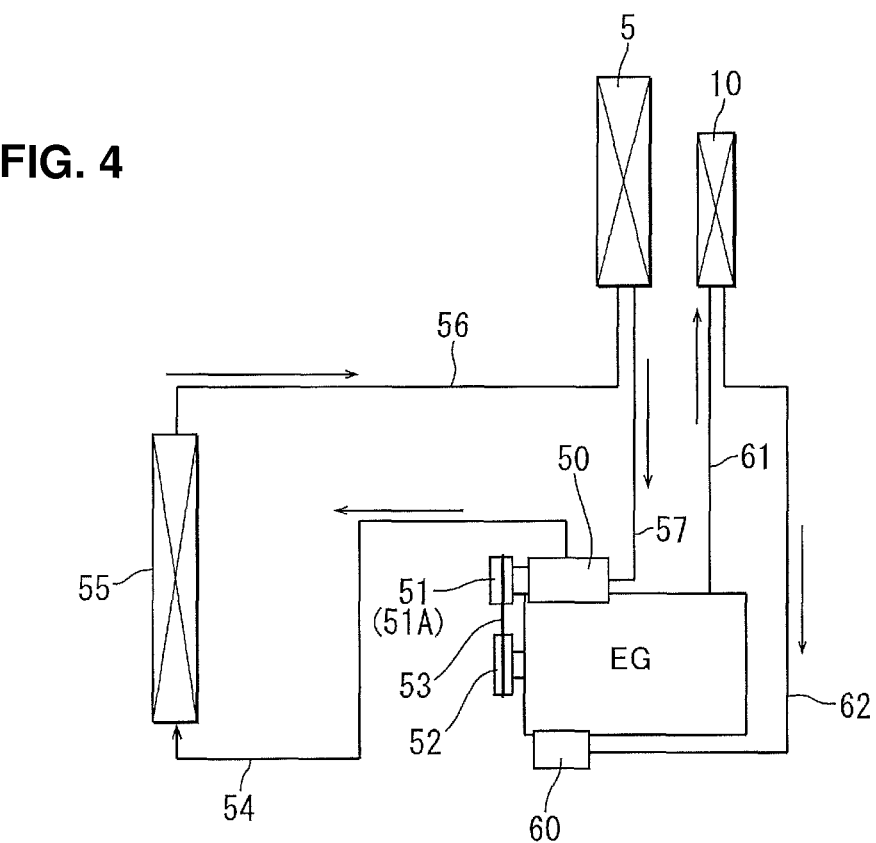
FIG. 4 is a diagram showing an example of a cool-air generator and a hot-air generator.

FIG. 4 shows a circulation path of a coolant for the evaporator 5 and a circulation path of engine cooling water for the heater core 10. In FIG. 4, a belt 53 is provided between a pulley 51 which is attached to a rotational shaft of a compressor 50 and a pulley 52 which is attached to an engine EG (a crankshaft). The compressor 50 is rotationally driven by the engine EG through the belt 53. The coolant which is compressed by the compressor 50 is supplied to the evaporator 5 through a supply pipe 54, a condenser 55, and another supply pipe 56. The coolant supplied to the evaporator 5 is returned to the compressor 50 through a supply pipe 57 after heat exchanging with the conditioning air. The above-described compressor 50, condenser 55 and evaporator 5 are main elements to comprise a cool-air generator. Herein, a clutch 51A is installed in the pulley 51, so that driving of the compressor 50 can be stopped even if the engine EG operates.

Meanwhile, the cooling water supplied from a water pump 60 which is driven by the engine EG is supplied to the heater core 10 through the supply pipe 61 and heat-exchanged with the conditioning air at the heater core 10. Then, the cooling water inside the heater core 10 is returned to the water pump 60 through a supply pipe 62. The above-described water pump 60 and heater core 10 are main elements to comprise a hot-air generator.

Figure 5:
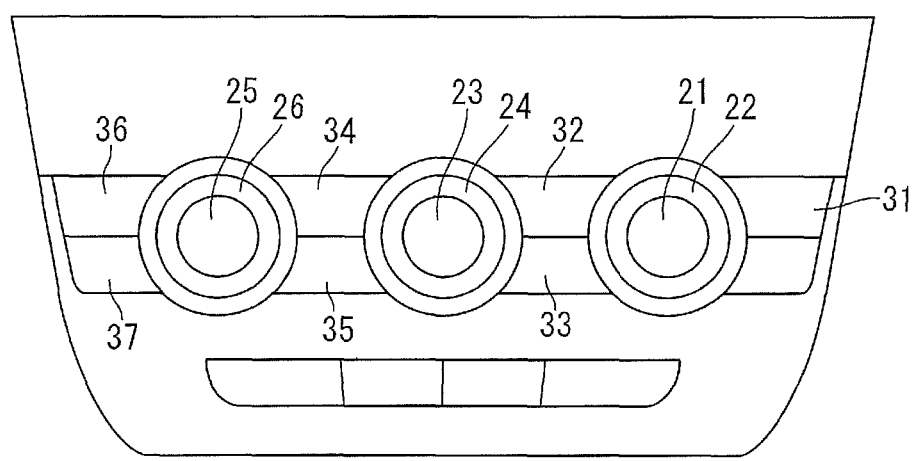
FIG. 5 is a diagram showing an example of an operational-panel portion of air conditioning.

FIG. 5 shows an example of a panel portion for air conditioning KP which is operated by a passenger, which is provided at an instrument panel. The present embodiment is configured such that the temperature control is provided independently for the driver's seat and the passenger seat by using the following switches.

First, a switch 21 is a main switch to activate (ON) the automatic air conditioning, which is a push type. A switch 22 is a temperature-setting switch of the driver's seat, which is a dial type. A switch 23 is an OFF switch to deactivate the automatic air conditioning, which is the push type. A switch 24 is a switch for adjusting the air-flow amount, which is the dial type. A switch 25 is a switch to be operated for selecting the conditioning-air temperature for the passenger seat independently, which is the push type. A switch 26 is a switch for adjusting the conditioning-air temperature for the passenger seat, which is the dial type.

A switch 31 is the one to deactivate (OFF) the air conditioning. A switch 32 is a switch for operating a front defroster. A switch 33 is a switch for operating a rear defroster. Switches 34, 35 are switches for selecting conditioning-air outlets. A switch 36 is a switch for selecting the outside-air introduction. A switch 37 is a switch for selecting the intake-air circulation. Each of switches 31-37 is the push type.

Figure 6:
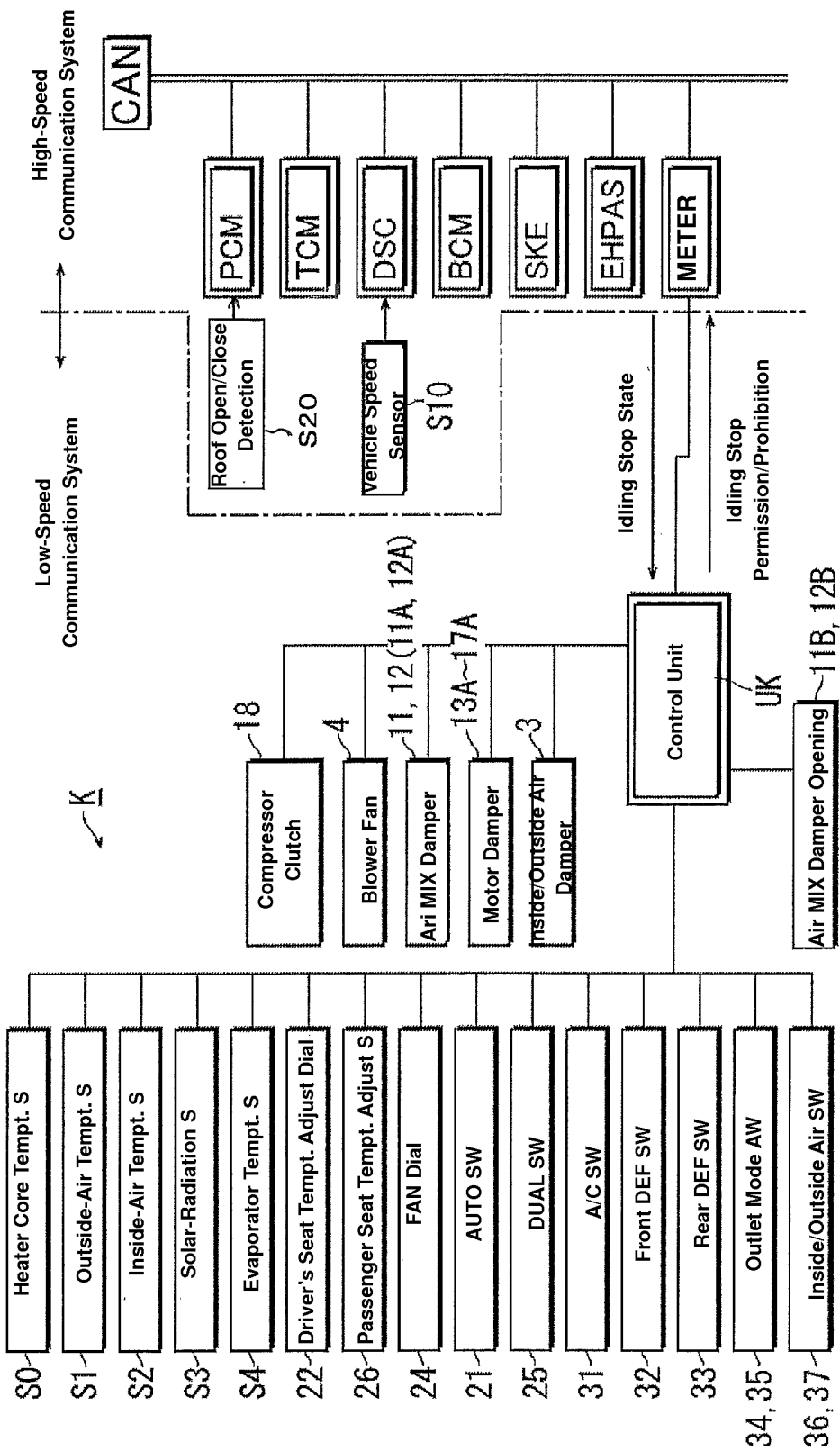
FIG. 6 is a diagram showing an example of a control system of the air-conditioning system.

FIG. 6 shows an example of a control system of the air-conditioning system K. In this figure, UK is a controller (control unit) of the air-conditioning system K, which is a microcomputer. To this controller UK are inputted signals from the above-described various kinds of switches and also various signals regarding the temperature of the heater core 10 which is detected by a temperature sensor S0, the outside-air temperature which is detected by an outside-air temperature sensor S1, an inside temperature which is detected by an inside-air temperature sensor S2, a solar-radiation state in a vehicle compartment which is detected by a solar-radiation sensor S3, and the temperature of the evaporator 5 which is detected by a temperature sensor S4, and additionally signals from opening sensors 11B, 12B which detect the actual opening degrees of the air mixture dampers 11, 12. Further, the controller UK is configured to control not only the above-described auxiliary instruments, such as the dampers, 1, 4, 11 (11A), 12 (12A), 13A-17A, 18 but also the compressor clutch 51A (see FIG. 4) which is provided between the engine and the compressor for compressing the coolant in a power transmission path. The controller UK and the above-described sensors, switches and instruments are connected with a low-speed communication system.

The controller UK is configured to set a target inside temperature and also automatically control a conditioning-air supply amount, a conditioning-air temperature, a selection of the conditioning-air outlet and others for adjusting the actual inside temperature at the above-described target inside temperature according to various vehicle inside/outside environmental conditions detected by the sensors S0-S4 and states of the respective switches operated by the passenger basically.

The controller UK of the low-speed communication system is connected to a high-speed communication system (CAN) via a meter provided at the instrument panel. This high-speed communication system includes PCM to conduct an engine control including an engine automatic stop and an engine automatic restart, TCM to conduct a shift control of an automatic transmission, DSC to conduct a brake control including an automatic brake control at the engine automatic stop, BCM to conduct a control of a vehicle body including detection of an open/closed state of a door, a keyless control module (indicated by SKE) to conduct a control of a smart keyless including detection of a state where a key is left behind in the vehicle compartment, and EHPAS to conduct a power steering control. Information regarding an idling stop state is inputted to the controller UK from the PCM, and the controller UK outputs signals for permission or prohibition of the idling stop to the PCM according to an air-conditioning control state, which will be described later. Further, a vehicle-speed sensor S10 is connected the DSC, and a vehicle-speed signal which is detected by the vehicle-speed sensor S10 is inputted to the controller UK by way of the CAN.

Figure 7:
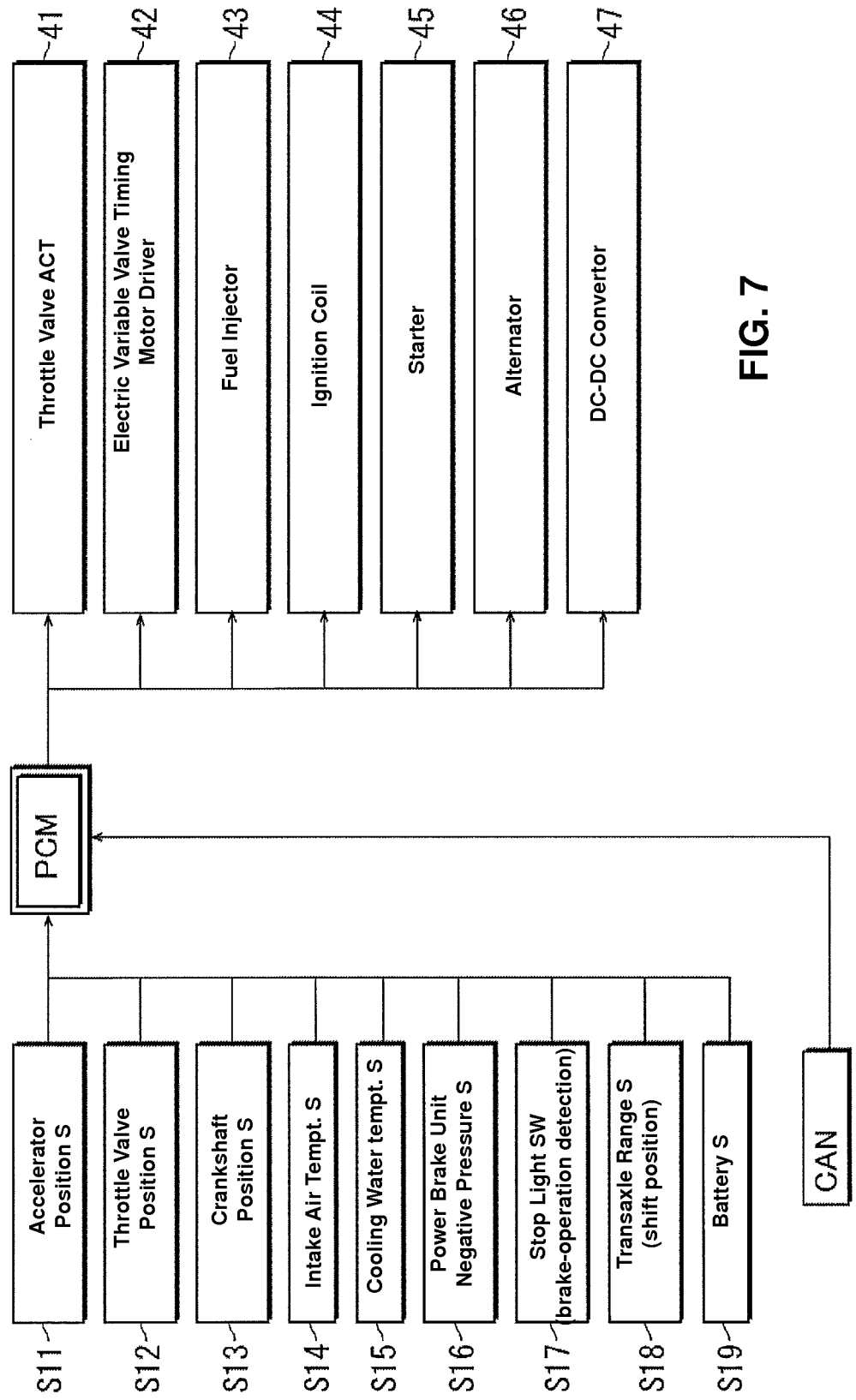
FIG. 7 is a diagram showing an example of a control system of automatically stopping an engine.

FIG. 7 shows an example of a specific control system regarding the PCM to conduct the control regarding the idling stop. In this figure, signals from the various kinds of sensors and switches S10-S19 are inputted to the PCM. A sensor S11 is an accelerator sensor to detect an accelerator opening. A sensor S12 is a throttle sensor to detect a throttle opening. A sensor S13 is an angle sensor to detect a rotational-angle position of a crankshaft. A sensor S14 is an intake-air temperature sensor to detect the temperature of intake air of the engine. A sensor S15 is a water temperature sensor to detect the temperature of the cooling water. A sensor S16 is a negative-pressure sensor to detect a negative pressure of a brake device having a negative-pressure type booster. A switch S17 is a brake switch to detect a braking operation of a brake pedal (multi-use with a stop-light switch). A senor S18 is a range positional sensor to detect a range position of the automatic transmission. A sensor S19 is a battery sensor to totally detect a charge amount, a voltage, consumption current, and others of a battery.

The PCM controls the following various kinds of instruments 41-47 in connection with the control of the automatic stop (the idling stop) and the automatic restart of the engine. The instrument 41 is an actuator to drive the throttle valve, which is completely closed. The instrument 42 is a drive motor of an electromagnetic type of variable valve-timing device, which retards the opening/closing timing of an intake valve to prepare for the automatic restart. The instrument 43 is a fuel injector, which is controlled to shut down its fuel injection at the engine automatic stop. The instrument 44 is an ignition coil, which is controlled to shut down its power supply at the engine automatic stop. The instrument 45 is a starter, which is driven at the engine automatic restart. The instrument 46 is an alternator, which is controlled to increase its load for a decrease of the engine speed at the engine automatic stop. The instrument 47 is a DC/DC convertor, which is controlled to compensate a power decrease of the battery when engine's cranking is conducted for the engine automatic restart. Herein, a signal from a switch S20 to detect opening/closing (to judge an open state or a closed state) of the roof R is inputted to the PCM.

While the idling stop in which the engine is automatically stopped is conducted when the vehicle stops, this idling stop is attained on the condition that any one of the following idling-stop prohibition conditions is not met.

Automatic-Stop Prohibition Conditions (Idling-Stop Prohibition Conditions):
(1) the vehicle speed is not zero;
(2) a braking operation by the passenger is not conducted;
(3) a pressing operation of the accelerator is conducted;
(4) the battery voltage is a specified voltage or lower, the battery charge amount is a specified charge amount or smaller, the battery consumption current is a specified current or greater, or the battery control system is in an abnormal state (when an abnormal signal is generated);
(5) a steering angle of a steering wheel is not within a specified small-angle range from a neutral position;
(6) the shift range of the transmission is not located at the D-range position, the oil temperature of the transmission is not within a specified temperature range, the oil pressure of the transmission is not within a specified pressure range, an abnormal signal of the transmission is not generated, clutches (including a lockup clutch) is in an abnormal state;
(7) the cooling-water temperature of the engine is not within a specified temperature range, the intake-air temperature of the engine is too high, or the atmospheric pressure is low;
(8) the negative pressure of the brake device having the negative-pressure type booster is insufficient, or an abnormal signal of an engine system is generated;
(9) an ignition key is carried out of the vehicle (in a smart keyless entry system), a seatbelt is not applied, any of doors is open, or an engine hood (bonnet) is open;
(10) a slant angle of a road face is large; and
(11) an automatic stop prohibition signal is outputted from the controller for air conditioning UK (which will be specifically described later).

The above-described automatic-stop prohibition conditions merely show one example, and any other prohibition condition may be added. For example, additional conditions that an IS switch S5 to cancel (prohibit) the engine automatic stop because of the driver's intention is ON, the engine speed is a predetermined speed (which is considerably higher than a stable idling speed) or higher, or the like may be added. Conversely, a part of the above-described conditions may be omitted.

The automatic-restart start condition for automatically restarting the engine from the idling-stop state of the engine can be set as a condition that any one of the above-described automatic-stop prohibition conditions is cancelled. In particular, it may be preferable that at least the driver's brake operation being cancelled be set as the automatic-restart start condition.

Next, the automatic-stop prohibition conditions relating to the air-conditioning system K will be described. First, the automatic control of the air conditioning is attained so that the actual temperature in the vehicle compartment detected by the inside-air temperature sensor S2 can become the target inside temperature set based on the temperature adjusting dial switches 22, 26 that are selected by the passenger. In this air-conditioning automatic control, the conditioning-air temperature, the selection of the conditioning-air outlet, the conditioning-air supply amount and others are automatically controlled.

The controller for air conditioning UK outputs a prohibition signal to automatically prohibit the engine's automatic stop when the vehicle stops for the priority of the air conditioning in the following cases. Herein, the controller for air conditioning UK outputs an automatic-stop permission signal when not outputting the automatic-stop prohibition signal.

Automatic-Stop Prohibition Conditions from Air-Conditioning Side:
(1) any abnormality of the various kinds of sensors and others in the air-conditioning system K happens;
(2) the outside-air temperature is extremely high (40° C. or higher, for example) or extremely low (−10° C. or lower, for example);
(3) the defroster is used (for the priority of view security);
(4) the inside temperature selected by the passenger is an upper limit of the high temperature side (the heating demand is extremely high);
(5) the inside temperature selected by the passenger is a low limit of the low temperature side, and the air conditioner is operated (the cooling demand is extremely high); and
(6) the difference between the target inside temperature and the actual inside temperature is larger than a specified value.

The controller for air conditioning UK conducts the air-conditioning control when the above-described automatic-stop prohibition conditions are not met even when the engine is automatically stopped.

The controller UK is configured such that the idling-stop condition in a case in which the roof is open (i.e., in the roof-open state) is relaxed so as to make the automatic idling stop of the engine to be relatively easily attained, compared to a case in which the roof is closed (i.e., in the roof-closed state). The setting of the idling-stop condition for this easier attainment is achieved by deleting any one or plural conditions among the above-described conditions (1)-(6). For example, the conditions (3) and (6) may be deleted. Thereby, the opportunity of automatically stopping the engine by the idling stop in the roof-open state is increased compared to the roof-closed state, so that the fuel economy can be improved.

Figure 8:
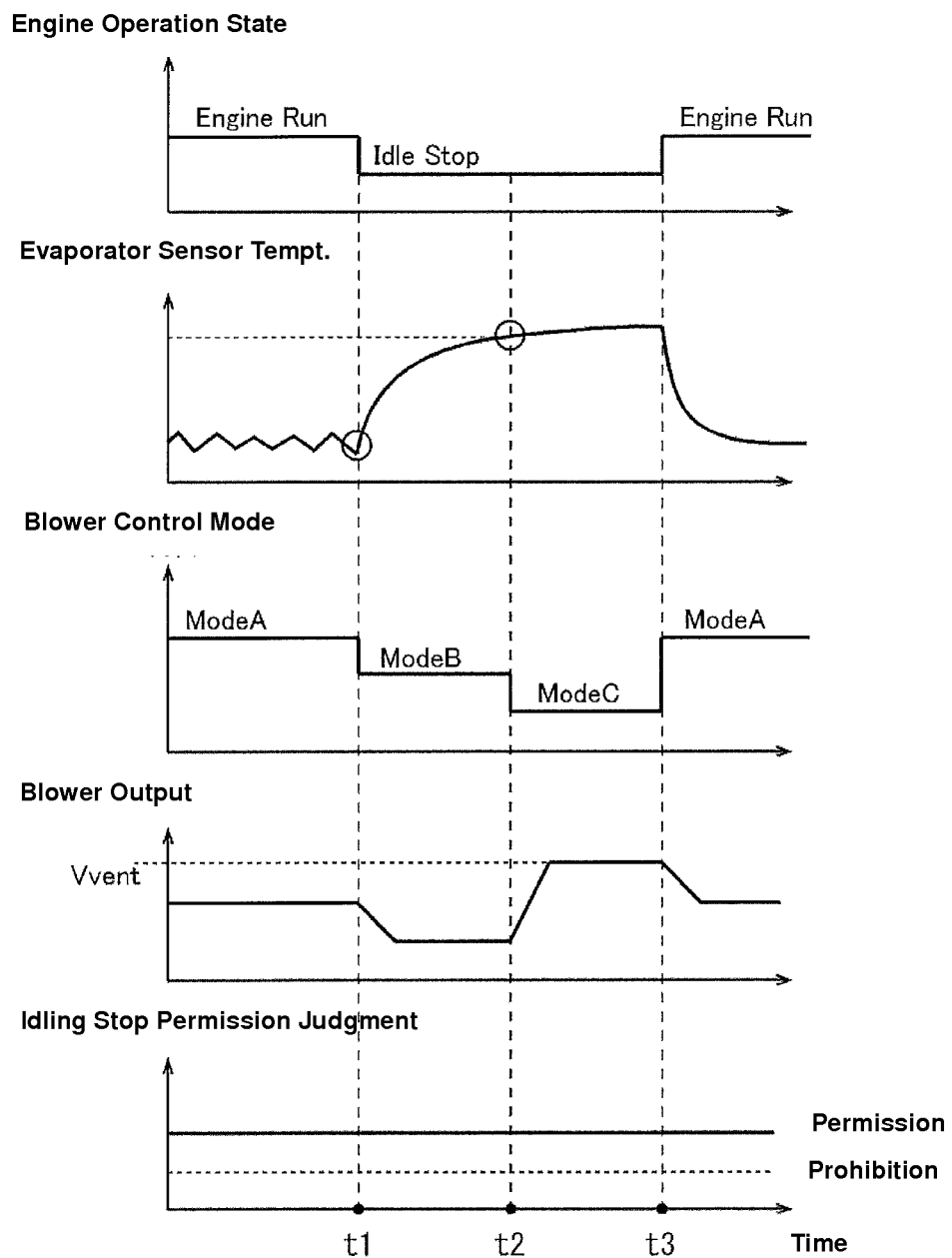
FIG. 8 is time charts showing an example of an air-conditioning control in a roof-open state.

An example of the air-conditioning control conducted in the roof-open state when the engine is automatically stopper by the idling stop will be described referring to time charts shown in FIG. 8. The time charts of FIG. 8 relate to the air-conditioning control which is conducted when the outside-air temperature is a specified temperature or higher, or a solar-radiation intensity is a specified degree or greater, in which the conditioning air is supplied toward the passenger by driving the blower fan 4 (because the engine stops, there is no function of cooling the evaporator 5 itself).

At the timing before a point of t1, the engine is driven and the amount of air flow (conditioning air) from the blower fan 4 becomes the amount which corresponds to a mode A (i.e., the amount which is set according to the target temperature). At this time, the evaporator 5 is in a sufficiently-cooled state.

The point of t1 is the timing the engine is automatically stopped by the idling stop. At this time, an applied voltage to the blower fan 4 is decreased and the air-flow amount becomes the one at a mode B. This air-flow amount at the mode B is a first air-flow amount which is smaller than the air-flow amount at the mode A. At the timing right after the engine is automatically stopped, since the evaporator 5 has been sufficiently cooled, the conditioning air is cooled when flowing down through the evaporator 5. Thereby, the properly-cooled conditioning air is supplied toward the passenger, so that the passenger can be prevented from having any uncomfortable feelings. Further, the air-flow amount is decreased, so that the cool air can be supplied as long as possible.

The point of t2 when a specified time has passed from the point of t1 is the timing the temperature of the evaporator 5 increases considerably and becomes a high temperature. At this time, the air-flow amount by the blower fan 4 becomes the one at a mode C (a second air-flow amount) which is larger than that at the mode B or the mode A. Thus, the air-flow amount is made sufficiently large in a situation where the temperature of the evaporator 5 so increases that the sufficiently-cool air is not obtained, so that the passenger can be prevented from having any uncomfortable feelings.

At the point of t3, the pressing operation of the brake pedal is cancelled (released) or the pressing operation of the accelerator is conducted, for example, so that the engine is automatically restarted. After the point of t3, the air-flow amount of the blower fan 4 is returned to the air-flow amount at the mode A right before the engine's automatic stop.

Figure 9:
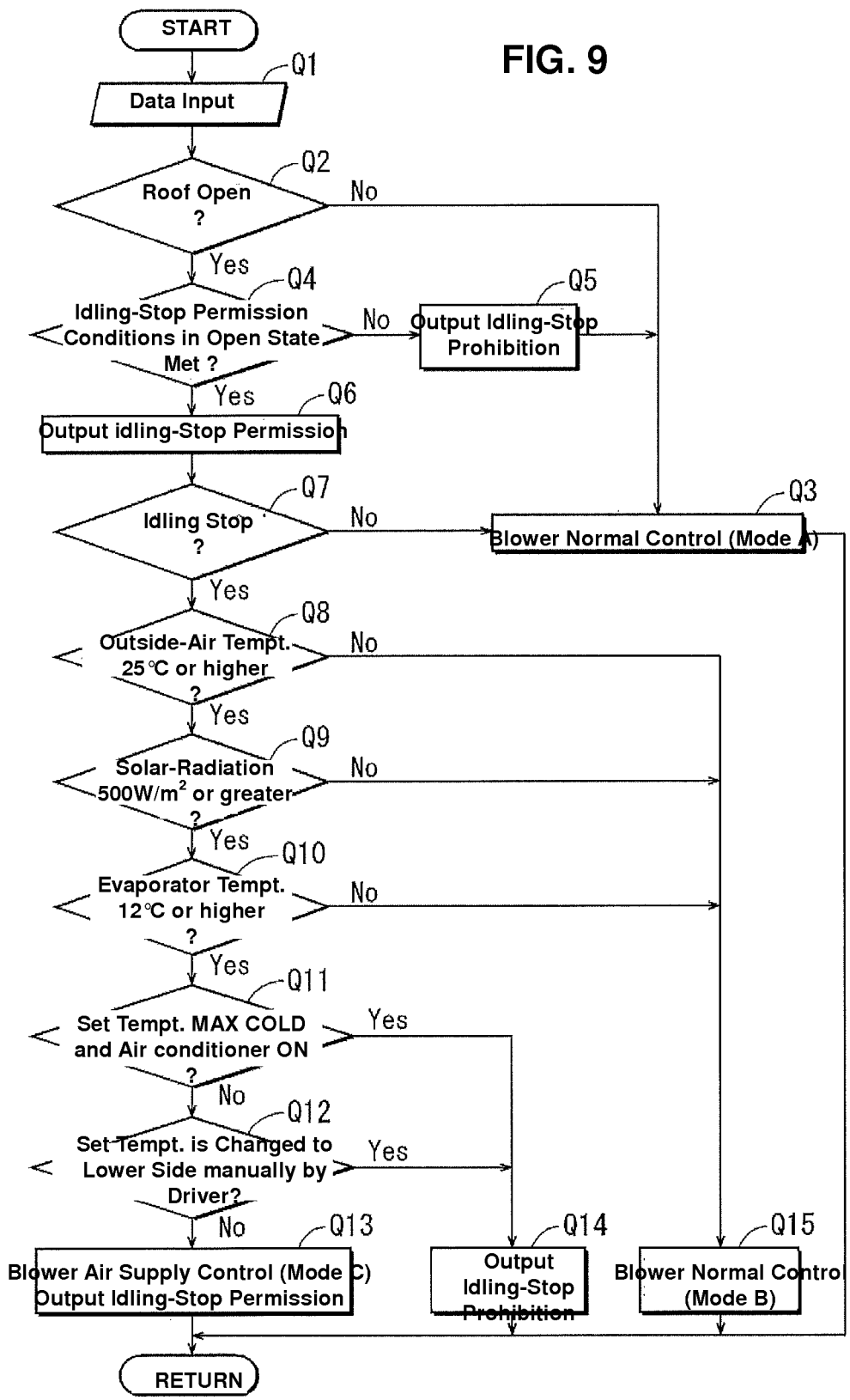
FIG. 9 is a flowchart showing an example of the air-conditioning control in the roof-open state.

FIG. 9 is a flowchart showing an example of the air-conditioning control in the roof-open state, and hereafter this flowchart will be described. In the following description, reference character Q means a control step.

First, in step Q1, the signals from the various kinds of sensors are read in, and then it is judged whether the roof is open as shown in FIG. 2 or not in the next step Q2. When the judgment of the step Q2 is NO, the control proceeds to step Q3, where the blower fan 4 is controlled in a normal control manner (the air-flow amount at the mode A).

When the judgment of the step Q2 is YES, it is judged in step Q4 whether the idling-stop conditions in the roof-open state are met or not (as described above, the idling-stop condition in the roof-open state is relaxed so as to make the automatic idling stop of the engine to be relatively easily attained, compared to the roof-closed state). When the judgment of the step Q4 is NO, the signal for prohibiting the engine's automatic stop by the idling stop is outputted, and then the control proceeds to the step Q3.

When the judgment of the step Q4 is YES, the signal for permitting the engine's automatic stop by the idling stop is outputted in step Q6. Then, it is judged in step Q7 whether the engine is automatically stopped actually or not. When the judgment of the step Q7 is NO, the control proceeds to the step Q3.

When the judgment of the step Q7 is YES, it is judged in step Q8 whether or not the outside-air temperature is a predetermined specified temperature (32° C., for example) or higher. When the judgment of the step Q8 is NO, the control proceeds to step Q15, where the air-flow amount of the blower fan 4 is controlled at the smaller amount at the mode B.

When the judgment of the step Q8 is YES, it is judged in step Q9 whether or not the solar-radiation intensity is a predetermined specified degree or greater, specifically whether or not the amount of solar radiation is 500 W/m$^2$, for example, or greater. When the judgment of the step Q9 is NO, the control proceeds to the step Q15.

When the judgment of the above-described step Q9 is YES, it is judged in step Q10 whether or not the temperature of the evaporator 5 is a predetermined specified temperature (12° C., for example) or higher. When the judgment of the step Q10 is NO, the control proceeds to the step Q15.

When the judgment of the above-described step Q10 is YES, that is, it is considered that the evaporator 5 is sufficiently cooled, the control proceeds to step Q11, where it is judged whether or not the temperature set by the passenger is the low limit temperature and the air conditioner is ON (i.e., the air conditioning is demanded). When the judgment of the step Q11 is NO, it is judged in step Q12 whether the temperature-setting dial is operated toward the low-temperature side or not. When the judgment of the step Q12 is NO, the control proceeds to step Q13, where the signal for permitting the engine's automatic stop by the idling stop is outputted and the air-flow amount of the blower fan 4 is controlled at the large amount of air flow at the mode C (the second air-flow amount).

When the judgment of the above-described step Q11 is YES or the judgment of the above-described step Q12 is YES, the control proceeds to step Q14, where the signal for prohibiting the engine's automatic stop by the idling stop is outputted.

Figure 10:
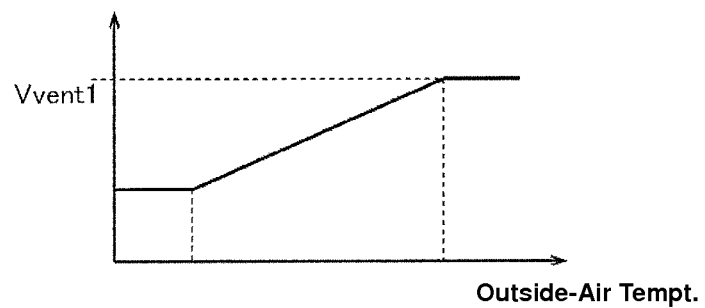
FIG. 10 is a characteristic diagram showing a setting example of a target air-flow amount according to an outside-air temperature.
Figure 11:
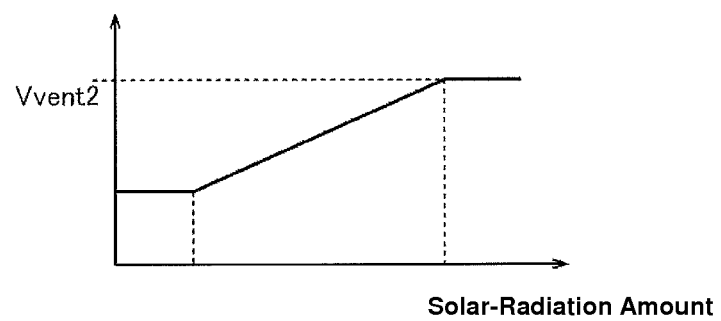
FIG. 11 is a characteristic diagram showing a setting example of the target air-flow amount according to a solar-radiation amount.

Herein, an example of setting the air-flow amount of the blower fan 4 will be described referring to FIGS. 9 and 10. In these figures, the target air-flow amount is indicated by the magnitude of the voltage for the blower fan 4. As shown in FIG. 9, the target air-flow amount is set to become larger (having an upper-limit value and a low-limit value) as the outside-air temperature becomes higher. Further, as shown in FIG. 10, the target air-flow amount is set to become larger (having an upper-limit value and a low-limit value) as the solar-radiation intensity becomes greater. A final target air-flow amount is obtained by adding the respective target air-flow amounts set based on FIGS. 9 and 10. Herein, this adding may be conducted through weighting of the target air-flow amounts according to the outside-air temperature and the solar-radiation intensity.

The present invention should not be limited to the above-described embodiment, and any other modifications or improvements may be applied within the scope of a sprit of the present invention. For example, the condition for controlling the air-flow amount at the one at the mode B may be set at a range from the start of the engine's automatic stop by the idling stop to the timing a specified constant time has passed from this start, and also the specified time may be configured to be variable according to the evaporator's temperature. After the passage of the above-described specified time, the air-flow amount may be controlled at the large one at the mode C. Herein, the air-flow amount at the mode C may be set at the one at the mode A or the one within a range between the air-flow amount at the mode A and the air-flow amount at the mode B.

The blow fan 4 may be driven unconditionally when the outside-air temperature is the specified temperature or higher or the solar-radiation intensity is the specified degree or greater at the engine's automatic stop in the roof-open state. Further, the air-flow amount at this time may be configured to be variable according to the outside-air temperature or the solar-radiation intensity (for example, the air-flow amount becomes larger as the outside-air amount become higher or the solar-radiation intensity becomes greater). The vehicle with the roof configured to be open and closed is not limited to the vehicle in which the roof is fully open, but to any other vehicles, such as a Targa-top type or a sun-roof type, in which the roof is partially open and closed. At the engine's automatic stop in the roof-open state, the conditioning air may be supplied only toward an upper half body of the passenger (a face, particularly), and also in case in which the passenger is seated only in a driver's seat, the outlet positioned on the driver's-seat side may be opened, closing the outlet positioned on the side of the passenger seat (assistant driver's seat). The object of the present invention is not limited to the one which has been described explicitly, but includes anything which may be explained implicitly as being substantially preferable or advantageous.

What is claimed is:

1. An air-conditioning control device for a vehicle, the vehicle provided with a roof which is configured to be open and closed, comprising:
    a controller configured to control an idling stop in which an engine is automatically stopped when a specified idling-stop condition including a vehicle stop is met; and
    a controller of an air-conditioning system which includes a blower fan for adjusting an air-flow amount and an evaporator for air conditioning which is cooled by a drive source of an engine,
    wherein said controller configured to control the idling stop is configured such that an idling-stop condition for stopping the engine automatically in a case in which the roof is open is subject to fewer idling-stop prohibition conditions, compared to a case in which the roof is closed, and
    said controller of the air conditioning system is configured to drive the blower fan so as to make conditioning air blow toward a passenger when an outside-air temperature is a specified temperature or higher or a solar-radiation intensity is a specified degree or greater in a case in which the roof is open and the engine is automatically stopped by the idling stop.

2. The air-conditioning control device for a vehicle of claim 1, wherein said controller of the air-conditioning system is configured to control the air-conditioning system such that at least for a specified period of time after the engine is automatically stopped by the idling stop, the conditioning air from the blower fan flows down through the evaporator and the air-flow amount is adjusted at a first air-flow amount which is smaller than an air-flow amount at the timing right before the engine is automatically stopped by the idling stop.

3. The air-conditioning control device for a vehicle of claim 2, wherein said controller of the air-conditioning system is configured to control the air-conditioning system such that after said specified period of time has passed, the air-flow amount is adjusted at a second air-flow amount which is larger than said first air-flow amount.

4. The air-conditioning control device for a vehicle of claim 3, wherein said second air-flow amount is configured to be larger than the air-flow amount at the timing right before the engine is automatically stopped by the idling stop.

5. The air-conditioning control device for a vehicle of claim 1, wherein said controller of the air-conditioning system is configured to control the air-conditioning system such that an air-flow amount of the conditioning air in a case in which the engine is automatically stopped by the idling stop changes according to at least one of the outside-air temperature and the solar-radiation intensity.

6. The air-conditioning control device for a vehicle of claim 2, wherein said controller of the air-conditioning system is configured to control the air-conditioning system such that an air-flow amount of the conditioning air in a case in which the engine is automatically stopped by the idling stop changes according to at least one of the outside-air temperature and the solar-radiation intensity.

7. The air-conditioning control device for a vehicle of claim 3, wherein said controller of the air-conditioning system is configured to control the air-conditioning system such that an air-flow amount of the conditioning air in a case in which the engine is automatically stopped by the idling stop changes according to at least one of the outside-air temperature and the solar-radiation intensity.

8. The air-conditioning control device for a vehicle of claim 4, wherein said controller of the air-conditioning system is configured to control the air-conditioning system such that an air-flow amount of the conditioning air in a case in which the engine is automatically stopped by the idling stop changes according to at least one of the outside-air temperature and the solar-radiation intensity.

9. The air-conditioning control device for a vehicle of claim 1, wherein, in the case in which the roof is closed, one of the idling-stop prohibition conditions is a determination of whether a difference between a target inside temperature and an actual inside temperature is larger than a specified value.

10. A method of controlling an air-conditioning device for a vehicle, the vehicle provided with a roof which is configured to be open and closed, the method comprising:
    controlling an idling stop in which an engine is automatically stopped when a specified idling-stop condition including a vehicle stop is met; and
    controlling an air-conditioning system which includes a blower fan for adjusting an air-flow amount and an evaporator for air conditioning which is cooled by a drive source of an engine,
    wherein, in said controlling the idling stop, an idling-stop condition for stopping the engine automatically in a case in which the roof is open is subject to fewer idling-stop prohibition conditions, compared to a case in which the roof is closed,
    in said controlling the air conditioning system, driving the blower fan so as to make conditioning air blow toward a passenger when an outside-air temperature is a specified temperature or higher or a solar-radiation intensity is a specified degree or greater in a case in which the roof is open and the engine is automatically stopped by the idling stop.

11. The method according to claim 10, wherein, in said controlling the idling stop, in the case in which the roof is closed, one of the idling-stop prohibition conditions is a determination of whether a difference between a target inside temperature and an actual inside temperature is larger than a specified value.

\* \* \* \* \*